US006976004B2

(12) United States Patent
Wittrup

(10) Patent No.: US 6,976,004 B2
(45) Date of Patent: Dec. 13, 2005

(54) INTERACTIVE KITCHEN CONTROL SYSTEM AND METHOD

(76) Inventor: Douglas Wittrup, 9929 Knoll Krest, Dallas, TX (US) 75238

( * ) Notice: Subject to any disclaimer, the term of this patent is extended or adjusted under 35 U.S.C. 154(b) by 289 days.

(21) Appl. No.: 10/114,769

(22) Filed: Apr. 2, 2002

(65) Prior Publication Data
US 2002/0174014 A1 Nov. 21, 2002

Related U.S. Application Data

(60) Provisional application No. 60/292,388, filed on May 21, 2001.

(51) Int. Cl.$^7$ .............................................. G06F 17/60
(52) U.S. Cl. ........................... 705/15; 99/325; 425/523
(58) Field of Search ......................... 705/15; 426/520, 426/523, 390, 685; 99/324, 325, 326, 327, 99/334, 335, 336, 339, 342, 344

(56) References Cited

U.S. PATENT DOCUMENTS

| | | | | |
|---|---|---|---|---|
| 4,388,689 A | | 6/1983 | Hayman et al. ............. 364/401 |
| 4,530,067 A | | 7/1985 | Dorr .......................... 364/900 |
| 4,807,169 A | * | 2/1989 | Overbeck ................... 708/200 |
| 4,919,950 A | * | 4/1990 | Mak ............................ 426/233 |
| 4,922,435 A | * | 5/1990 | Cahlander et al. ........... 700/247 |
| 5,218,527 A | | 6/1993 | Ishikawa et al. ............. 364/405 |
| 5,357,426 A | * | 10/1994 | Morita et al. ................. 700/90 |
| 5,386,762 A | * | 2/1995 | Gokey ......................... 99/326 |
| 5,426,280 A | * | 6/1995 | Smith ......................... 219/506 |
| 5,619,906 A | * | 4/1997 | Ishida ......................... 99/344 |
| 5,632,198 A | * | 5/1997 | Yamada ...................... 99/450.6 |
| 5,877,477 A | * | 3/1999 | Petty et al. ................... 99/325 |
| 5,881,632 A | * | 3/1999 | Fadoul ........................ 99/326 |
| 5,960,440 A | * | 9/1999 | Brenner et al. ........... 707/104.1 |
| 6,026,372 A | | 2/2000 | Savage ....................... 705/15 |
| 6,064,050 A | * | 5/2000 | Ishikawa et al. ............. 99/325 |
| 6,085,167 A | | 7/2000 | Iguchi ......................... 705/15 |
| 6,087,927 A | | 7/2000 | Battistini et al. ......... 340/286.09 |
| 6,088,681 A | * | 7/2000 | Coleman et al. ............. 705/15 |
| 6,334,684 B1 | * | 1/2002 | Yoshida et al. ............... 353/28 |
| 6,381,614 B1 | * | 4/2002 | Barnett et al. ........... 707/104.1 |
| 6,474,223 B2 | * | 11/2002 | Kurmlavage ................. 99/343 |
| 6,578,469 B2 | * | 6/2003 | Sharpe ........................ 99/342 |

(Continued)

FOREIGN PATENT DOCUMENTS

JP 04164410 * 6/1992 ........... A47J 27/00

(Continued)

OTHER PUBLICATIONS

Jennifer Lach, "Home on the Range Top," Oct. 1999, *American Demographics*, vol. 21, Issue 10, p. 11.*

(Continued)

*Primary Examiner*—Gerald J. O'Connor
(74) *Attorney, Agent, or Firm*—Steven W. Smith

(57) ABSTRACT

A system and method for controlling preparation of a plurality of food items on a cooking apparatus such as a grill. A food order consisting of the plurality of food items is input to a controller which retrieves cooking times for the items from a database. A primary fire item (PFI) is determined as the item with the longest cooking time. A display screen near the cook has a surface that is laid out in a grid pattern representing the cooking surface of the grill. An icon associated with the PFI is then displayed in a position corresponding to the item's intended position on the grill. Time delays are calculated for displaying subsequent icons so that, by placing the food items on the grill when each icon is displayed, the preparation of the food items is completed simultaneously.

16 Claims, 5 Drawing Sheets

U.S. PATENT DOCUMENTS

| | | | | |
|---|---|---|---|---|
| 6,789,067 B1 | * | 9/2004 | Liebenow | 705/15 |
| 2002/0171674 A1 | * | 11/2002 | Paris | 345/700 |

FOREIGN PATENT DOCUMENTS

| | | | | | |
|---|---|---|---|---|---|
| JP | 07306985 A | * | 11/1995 | | G06F 17/60 |
| JP | 10134113 | * | 5/1998 | | G06F 17/60 |
| JP | 10134251 | * | 5/1998 | | G07G 01/01 |
| JP | 2000166487 | * | 6/2000 | | A23L 01/00 |

OTHER PUBLICATIONS

'IntelliKitchen Kitchen Management system.' Web page [online]. Chickasaw Technology Products (CTP, later Apigent Solutions, now SIVA Corporation), Aug. 16, 2000 [retrieved on Jul. 22, 2005]. Retrieved from the Internet: <URL: web.archive.org/web/20000816235443/www.chickasawtech.com/PRODUCTS/intellik.htm>.*

Chuck Hutchcraft, "Equipped for Labor's Pains," Feb. 15, 2001, *Restaurants & Institutions*.*

Seth Mendelson, "Controlling Food Prep Work Flow," Apr. 2001, *Store Equipment & Design*.*

The Food Institute, "New Innovations Invade the Foodservice Kitchen," Apr. 2, 2001, *The Food Service Report*, p. 4.*

\* cited by examiner

US 6,976,004 B2

INTERACTIVE KITCHEN CONTROL SYSTEM AND METHOD

PRIORITY STATEMENT UNDER 35 U.S.C. §119(e) & 37 C.F.R. §1.78

This nonprovisional patent application claims priority based upon the prior U.S. provisional patent application entitled, "Interactive Kitchen Display System Utilizing Visual Representation of Cooktop," application No. 60/292,388, filed May 21, 2001 in the name of Douglas Wittrup.

BACKGROUND OF THE INVENTION

1. Technical Field of the Invention

This invention relates to interactive control systems. More particularly, and not by way of limitation, the present invention is directed to a system and method for controlling food preparation in a kitchen utilizing a visual representation of a cooking surface.

2. Description of Related Art

Current systems for controlling food preparation in restaurants are "ticket-based" systems. When a food server enters an order for a given table into a restaurant computer system, the system displays a ticket on a monitor in the kitchen. The displayed ticket contains the complete food order for the table. The order may contain a variety of food items, each of which may be cooked on a different cooking apparatus, such as a grill top, a deep fat fryer, an oven, a stove top, and the like. In addition, each of the food items may have different cooking times. Even for food items cooked on the same apparatus, the cooking time may vary due to the type of food being prepared (e.g., steak, chicken, fish, etc.), the thickness of each particular food item, the cooking temperature, and the degree of doneness desired by the customer.

When utilizing such ticket-based systems, the cook must determine when to place each item on its respective cooking apparatus so that the preparation of all of the items for one table is completed at the same time. This task is further complicated by the fact that the cook is simultaneously handling multiple orders for multiple tables. Good cooks are difficult to find, and are the most expensive employees that the restaurant owner must hire.

In order to overcome the disadvantage of existing solutions, it would be advantageous to have a system and method for controlling food preparation in a restaurant kitchen that precisely identifies each food item on a particular cooking apparatus, and notifies the cook when to start each item, and when each item is done. The present invention provides such a system and method.

SUMMARY OF THE INVENTION

In one aspect, the present invention is directed to a system for controlling preparation of a plurality of food items on a cooking apparatus having a cooking area. The system includes a visual display screen positioned for viewing by a cook. The display screen has a surface that is laid out in a grid pattern representing the cooking area of the cooking apparatus. The system also includes a controller and a database that stores cooking times for each of the plurality of food items. The controller includes means for displaying a plurality of icons on the display screen. Each of the icons corresponds to a particular one of the plurality of food items, and each of the icons is displayed on the display screen in a location corresponding to a position on the cooking area. The controller also includes means for retrieving the cooking times from the database, and means for indicating to the cook when to start each item, and when the preparation of each particular food item is complete.

In another aspect, the present invention is directed to a method of controlling preparation of a plurality of food items on a cooking apparatus having a cooking area. The method includes the steps of storing in a database, cooking times for each of the plurality of food items; inputting through an order-entry terminal, an order consisting of the plurality of food items; and retrieving the cooking times from the database for the plurality of food items included in the order. The method also determines a primary fire item (PFI) which is the food item in a particular order with the longest cooking time. The method also includes the steps of displaying a first icon associated with the PFI on a visual display screen positioned for viewing by a cook; calculating a time delay equaling a difference between the cooking time of the PFI, and the cooking time of a food item corresponding to a subsequent icon; and displaying the subsequent icon on the display screen when the calculated time delay expires. By placing the food items on the cooking area when each icon is displayed, the preparation of the food items is completed simultaneously.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
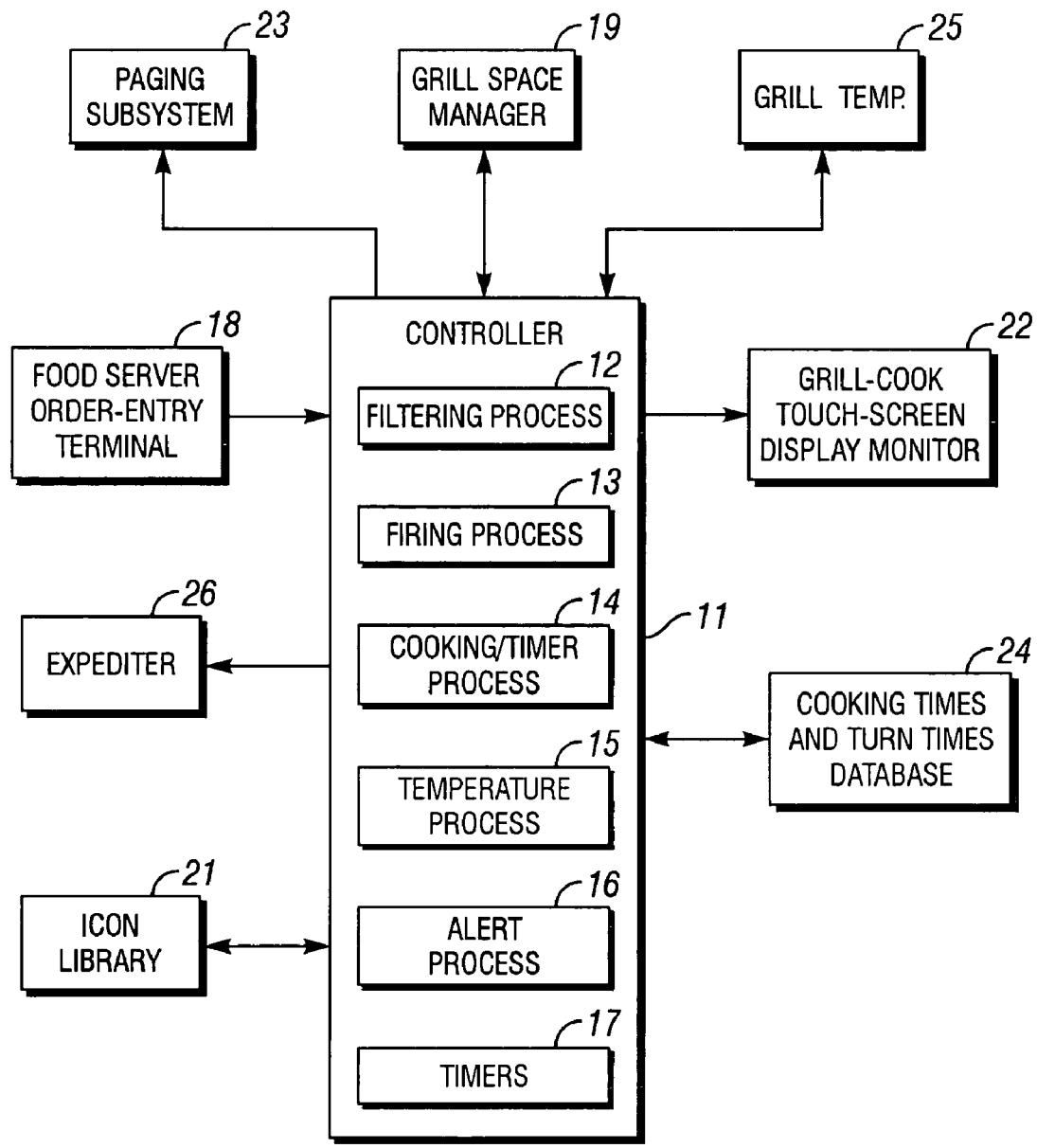
FIG. 1 is a simplified functional block diagram of an embodiment of the system of the present invention utilized with a grill.

FIG. 1 is a simplified functional block diagram of an embodiment of the system of the present invention utilized with a cooking apparatus such as a grill. The present invention is an item-based control system rather than a ticket-based control system. A Controller 11 includes a Filtering Process 12, Firing Process 13, Cooking/Timer Process 14, Temperature Process 15, Alert Process 16, and Timers 17. Each of these processes is described in further detail below. Through a point-of-sale (POS) interface, the Controller receives information relating to particular tickets from a food server order-entry terminal 18. When the food server enters an order, the order includes the food types, thickness (if applicable), and degree of doneness desired for each item. At that point, a grill-space manager 19 determines whether there is space available on the grill surface for any food item on the ticket that requires grilling. If there is space available, the Controller accesses an icon library 21, and displays an icon corresponding to the food item on one or more touch-screen display monitors 22. If there is no space available on the grill surface, the Controller calculates a time delay, and if the delay is excessive, may page a manager through a paging subsystem 23.

Each food item is broken down into components, and the Controller 11 then determines from a cooking times and turn times database 24, the proper cooking time for each item and component. The Controller then calculates when the cook should place each item on the grill, and when each item should be turned. A grill temperature sensor 25 may be utilized by the Controller to calculate the cooking time and turn time, which may vary according to the temperature of the grill. When the item is done, and is ready to "sell", the Controller sends a message to an expediter 26.

As noted, the system includes one or more display screen monitors 22 in the kitchen near the cook's station. The monitor provides a visual representation of the cooktop surface such as the cooking surface of the grill. Each type and thickness of food has an associated icon that the Controller 11 displays on the monitor in the kitchen. The Controller displays each icon on the monitor in the position where the cook should place the corresponding food item on the cooking apparatus. The display screen is laid out in a grid so that the Controller knows the physical location where each item has been placed. The Controller also knows the amount of space occupied by each item, and thus can determine, at any given time, whether there is any space available. Each icon is displayed at the proper time so that every item in the order is done to the desired degree at the same time.

It should be understood that the present invention is applicable to any type of cooking apparatus such as, but not limited to, grills, deep fat fryers, ovens, stove tops, and the like. In addition, the system may control a plurality of display monitors, with each monitor visually representing the cooking surface of a different cooking apparatus. For example, one monitor may represent the surface of a grill while another monitor represents positions on the shelf of an oven. If an order includes, for example, a hamburger (cooking time 6 minutes) and french fries (cooking time 3 minutes), the system will first display an icon corresponding to the hamburger on the monitor representing the oven. Three (3) minutes later, the system will display an icon corresponding to the french fries on the monitor representing the grill.

When each icon appears, the cook places the corresponding food item on the cooking apparatus in the position indicated on the monitor 22. The monitor may be a touch screen display, enabling the cook to touch the icon on the screen to indicate to the Controller 11 that the action has been taken. The Controller then starts the countdown timer 17 for that item, and updates the Estimated Time to Completion (ETC). Icons continue to appear in their assigned positions on the monitor when it is time to place additional items on the grill. When it is time to turn an item, this may be indicated in some way such as rotating the icon, flashing the icon, or changing its color. Likewise, when an item is done, a different indication is given to the cook to indicate that the item should be removed.

In each case, the cook performs the indicated action and touches the icon on the display screen 22. If the cook does not respond to a displayed or changed icon, the system may try several levels to alert the cook such as color changes or an audio alert. If the cook fails to respond to all alerts within a specified time period, the system may use the paging subsystem 23 to page a manager to investigate.

Some items may be more accurately cooked by checking the internal temperature with a probe. Therefore, the Controller 11 may also manipulate the icon or provide some other indication to the cook when it is time to check the temperature on an indicated item.

In the preferred embodiment of the present invention, whenever the cook is required to take an action, he must touch the icon on the monitor screen 22 to indicate that the action has been taken. The system updates the ETC, and determines whether the new ETC falls within acceptable parameters. For example, the cook may delay too long in putting on a steak, and the ETC may indicate that the steak will not be done for too long a time after the rest of the food items in the order are ready. Whenever the new ETC does not fall within acceptable parameters, an alert is indicated, and the manager may be paged.

At any given time, the Controller 11 knows how much space is left on each cooking apparatus, and how much cooking time is left for each item. Therefore, if an order for a table comes in, and the required cooking apparatus is full or does not have enough space for the new order to be placed on the apparatus within a predefined time period, a message may be sent to the restaurant manager using the paging subsystem 23. The manager may then choose to visit the table and explain to the customers that there will be a slight delay.

The icons displayed on the monitor screen 22 may pictorially represent the corresponding food items. Thus, the basic functionality of the present invention is language-independent, and may be used with grill cooks who speak any language.

Figures 2, 3:
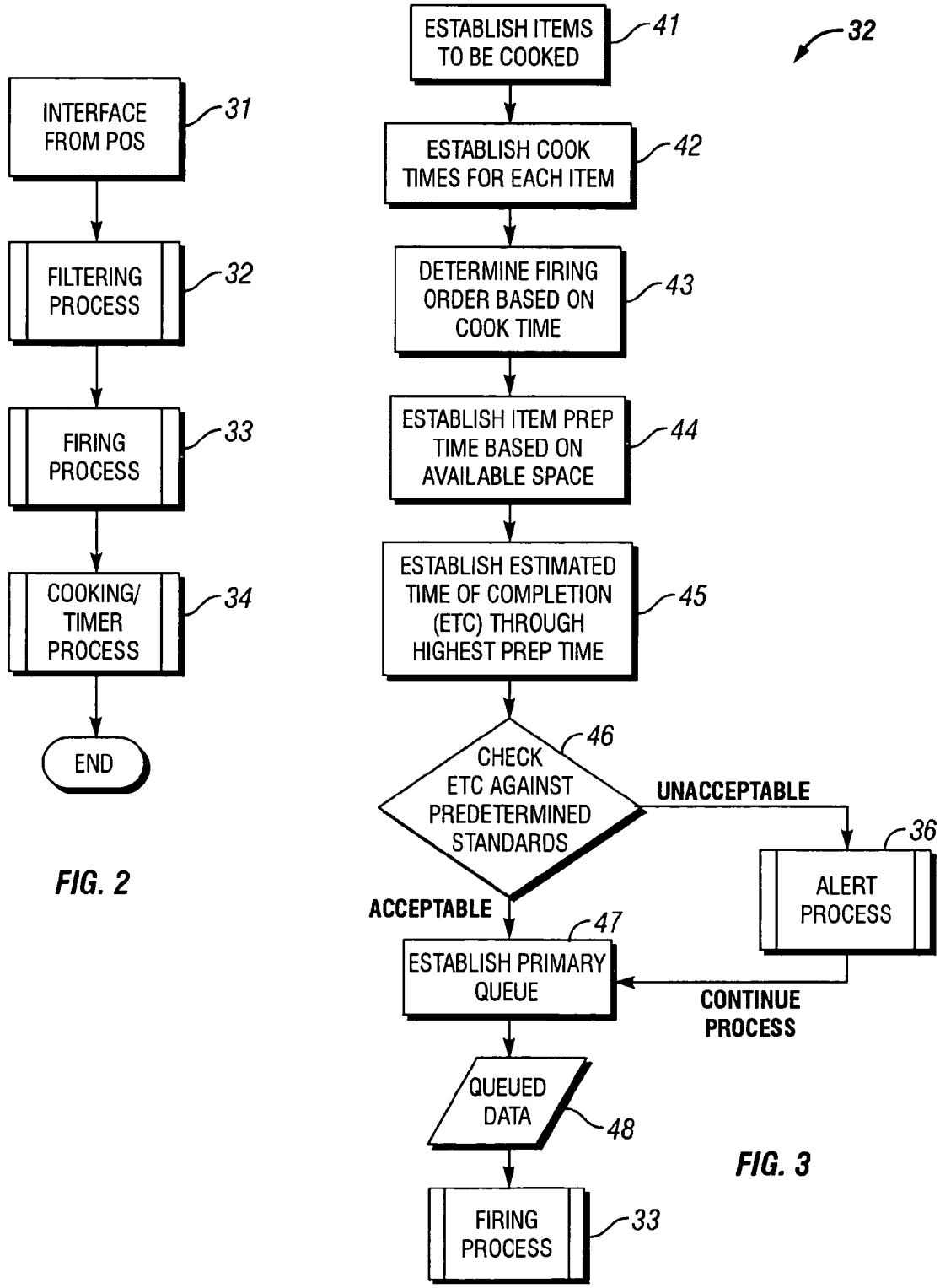
FIG. 2 is a flow chart of an overall process flow performed by the system of the present invention.
FIG. 3 is a flow chart of a filtering process performed by the system of the present invention.

FIG. 2 is a flow chart of an overall process flow performed by the system of the present invention. At step 31, the Controller 11 receives information relating to a particular ticket through the POS interface from the food server order-entry terminal 18. When the food server enters an order, the order includes the food types, thickness (if applicable), and degree of doneness desired for each item. The system then performs a filtering process 32 (see FIG. 3); a firing process 33 (see FIG. 4), and a cooking/timer process 34 (see FIG. 5). A temperature process 35 (see FIG. 6) and an alert process 36 (see FIG. 7) may also be performed if conditions warrant.

FIG. 3 is a flow chart of the filtering process 32 performed by the system of the present invention. When the system receives an order (ticket) from the order-entry terminal 18, the Controller 11 filters the order into component parts (items) at step 41. The items are then sorted based upon their relative cooking times and the capacity of the equipment used to cook them. Thus at step 42, the cooking time for each item is determined, and at step 43, the system determines the firing order for the items based on their cooking times. At step 44, the item preparation time is determined for each item based on the available space on the cooking surface.

Once the items are sorted, an Estimated Time of Completion (ETC) is generated at step 45 based upon the item with the longest preparation time. The ETC is a time period that begins as the sum of the cooking time for a Primary Fire Item (PFI) and the primary queue. It then counts down the completion of the ticket. The PFI is the item with the longest cooking time upon which the firing order of the other items will be based. The cooking time is generally the sum of the turn times for a particular item. The primary queue is the wait time before the PFI is fired. It is zero or the highest preparation time minus the PFI cook time, whichever is greater. An item's preparation time is defined as the sum of an item's cook time and queue time, the queue time being the time an item waits before the cooking process begins based on available equipment capacity.

At step 46, the ETC is compared to the restaurant's acceptable cooking time standard. If the ETC exceeds the acceptable standard, the process performs the alert process 36 (see FIG. 7). An alert to management may be generated utilizing, for example, the paging subsystem 23. However, if the ETC is acceptable, a primary queue is established at step 47 based upon the relative cooking times of the items. At step 48, the queued data is provided to the firing process 33, thus ensuring that the cooking process for each item in the ticket is completed at approximately the same time.

Figure 4:
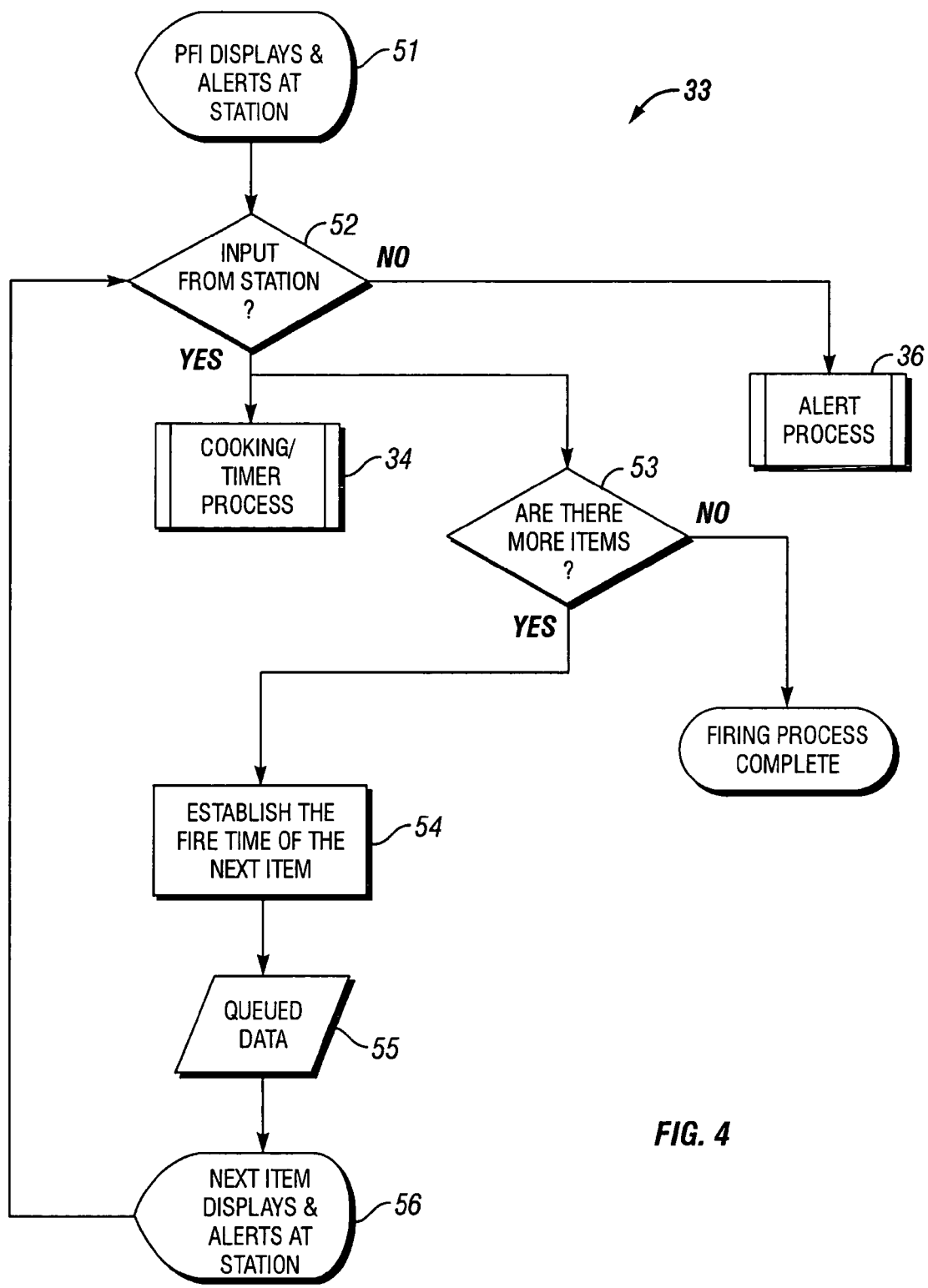
FIG. 4 is a flow chart of a firing process performed by the system of the present invention.

FIG. 4 is a flow chart of the firing process 33 performed by the system of the present invention. From FIG. 3, the sorted items are sent to their appropriate cooking stations based upon the timing of the firing queue. At step 51, an icon for the PFI is displayed on the monitor screen 22 at a position corresponding to the position at which the cook should place the item on his grill fryer, broiler, and so on. The monitor may "beep" or provide some other signal to get the cook's attention. At step 52, the Controller 11 determines whether or not an acknowledgment is received from the cook that the item has begun the cooking process. If an acknowledgment is not received within a predefined period of time, the process may perform the alert process 36 (see FIG. 7) and update the ETC. However, if an acknowledgment is received, the process performs the cooking/timer process 34 (see FIG. 5).

Simultaneously, the process moves to step 53 where it is determined if there are additional items. If not, the firing process is complete. However, if there are additional items, the process moves to step 54 where the fire time of the next item is determined. The fire time may be determined from the queued data at step 55. At step 56, an icon for a the next item is displayed on the monitor screen 22 at a position corresponding to the position at which the cook should place the item on the cooking apparatus. The process then repeats itself until all items have been fired.

Figure 5:
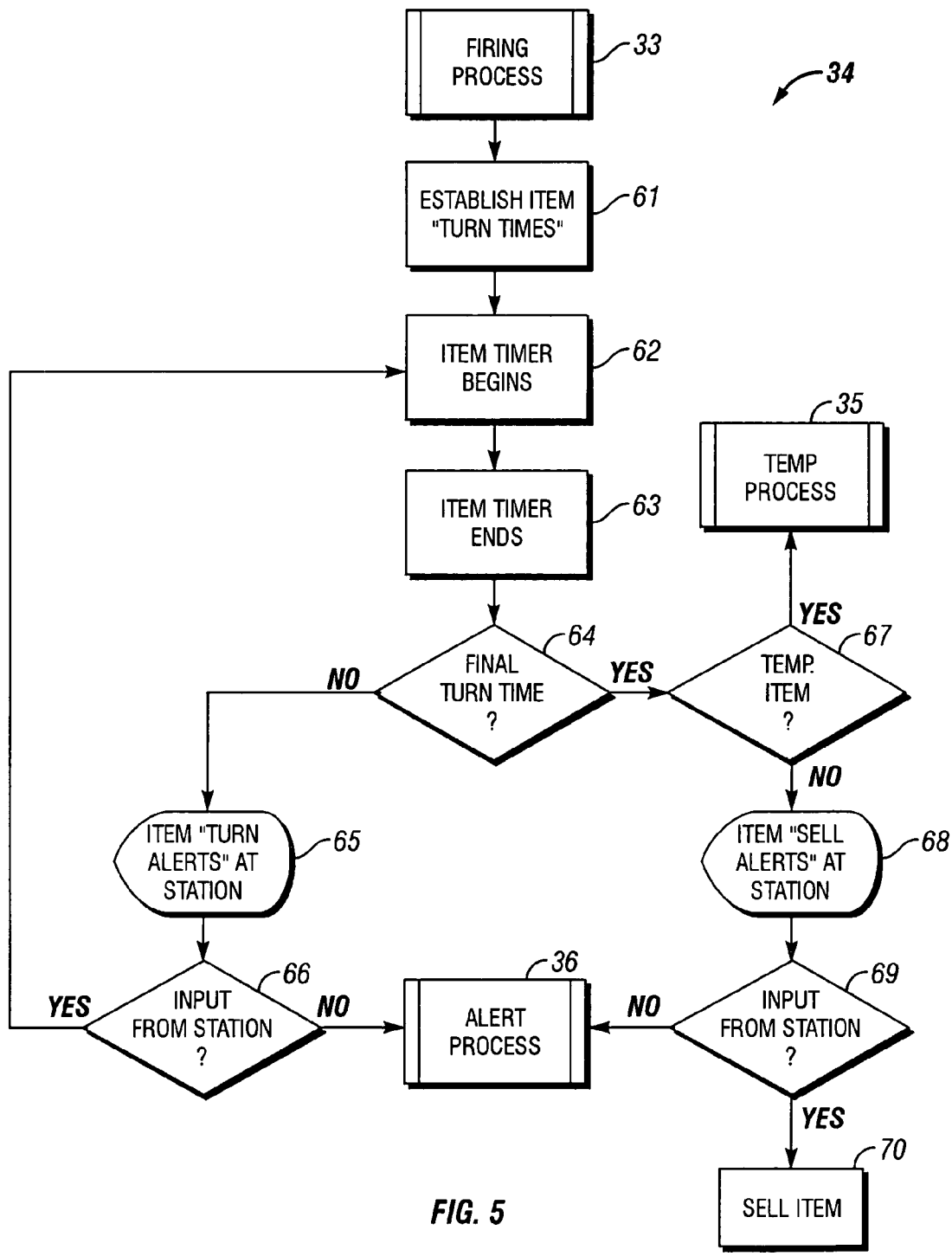
FIG. 5 is a flow chart of a cooking/timer process performed by the system of the present invention.

FIG. 5 is a flow chart of the cooking/timer process 34 performed by the system of the present invention. Once an item is fired in the firing process 33, the item's overall cooking time is broken down into turn times at step 61. At step 62, one of the timers 17 is utilized to determine when the turn time for each item has expired. After each item's turn time expires at step 63, it is determined at step 64 whether the expiring turn time is the item's final turn time. If not, the process moves to step 65 where an indication is provided on the monitor for the cook to turn the item. The Controller 11 prompts the cook for an acknowledgment that the action step has been completed, and at step 66, it is determined whether an acknowledgment is received from the cook within a specified period of time. If not, the process performs the alert process 36 and updates the ETC. However, if an acknowledgment is received, the process returns to step 62 and starts a new turn timer for the item.

If it is determined at step 64 that the expiring turn time is the item's final turn time, the process moves to step 67 where it is determined whether or not the item is an item that should be tested for doneness with a temperature probe. If so, the process performs the temperature (temp) process 35. However, if the item is not an item that should be tested for doneness with a temperature probe, the process moves to step 68 where the Controller issues a "sell alert" at the cook's station, prompting the cook for an acknowledgment that the item has been "sold". At step 69, it is determined whether an acknowledgment is received from the cook within a specified period of time. If not, the process performs the alert process 36 and updates the ETC. However, if an acknowledgment is received, the process moves to step 70 where the item is "sold" by, for example, sending an indication to the expediter 26 that the item is ready to serve.

Figures 6, 7:
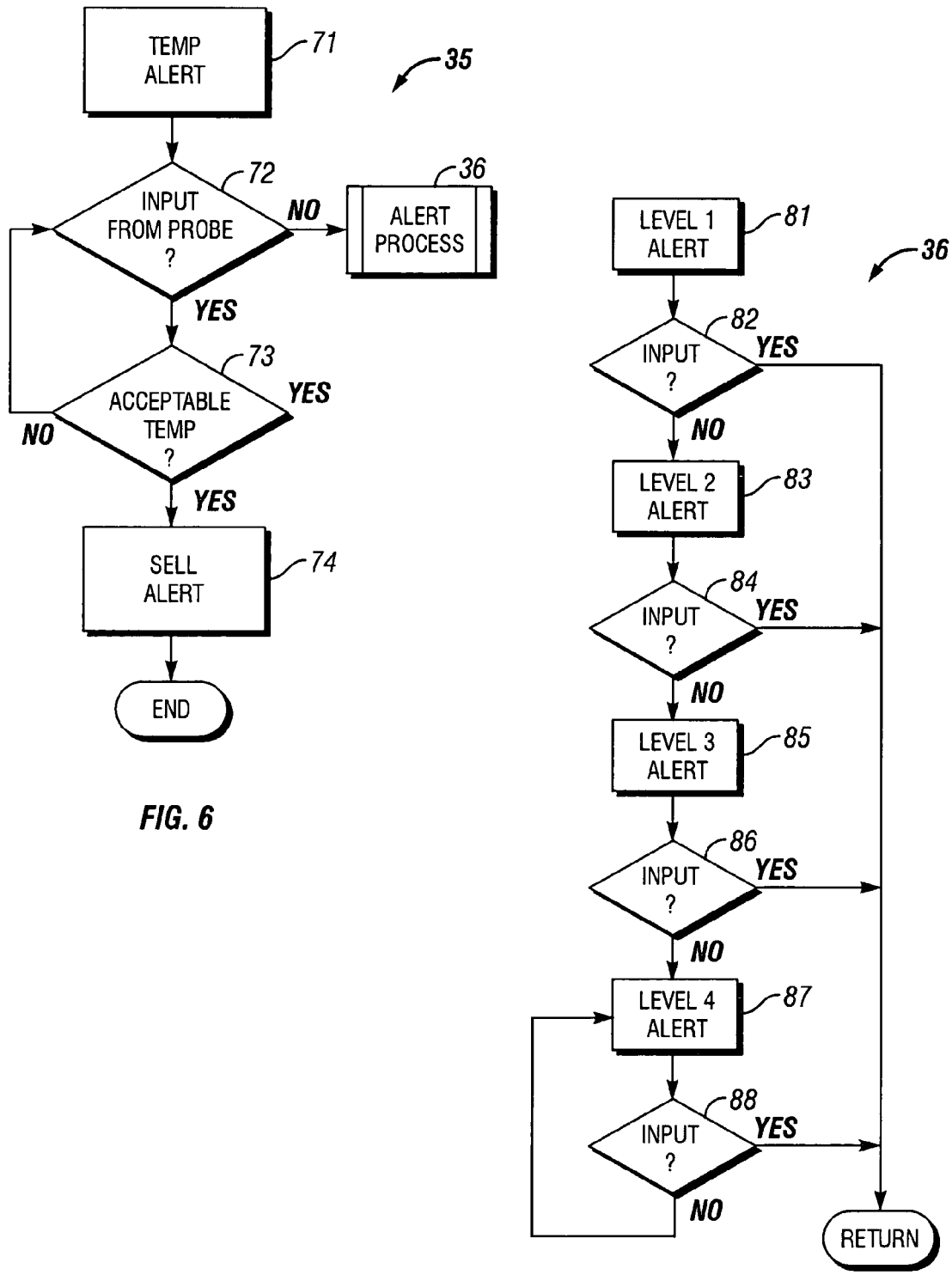
FIG. 6 is a flow chart of a temperature process performed by the system of the present invention.
FIG. 7 is a flow chart of an alert process performed by the system of the present invention.

FIG. 6 is a flow chart of the temperature process 35 performed by the system of the present invention. If a food item is an item that should be tested for doneness with a temperature probe, the Controller 11 issues a temperature alert at step 71, instructing the cook to determine the temperature of the item with the temperature probe. At step 72, it is determined whether or not an input is received from the probe within a specified period of time. If not, the process performs the alert process 36 and updates the ETC. However, if an input is received from the probe within the specified period of time, the process determines at step 73 whether the temperature is acceptable. If not, the process continues to loop between steps 72 and 73 until the temperature reaches an acceptable level. At step 74, the Controller prompts the cook to "sell" the item once an acceptable internal temperature is reached.

FIG. 7 is a flow chart of the alert process 36 performed by the system of the present invention. If the cook does not respond to a displayed or changed icon, the system may try several levels to alert the cook. At step 81, a level-1 alert is attempted. For example, the color of the displayed icon may be changed. At step 82, it is determined whether or not an input is received from the cook within a specified period of time. If not, the process may attempt a level-2 alert at step 83. For example, the icon may be made to flash on the display screen. Once again, at step 84, it is determined whether or not an input is received from the cook within a specified period of time. If not, the process may attempt a level-3 alert at step 85. For example, an audio alert may be sounded to get the cook's attention. Once again, at step 86, it is determined whether or not an input is received from the cook within a specified period of time. If not, the process performs a level-4 alert at step 87. This alert may include paging the manager to investigate why the cook has not responded. This level of alert may continue until an input is received at step 88. At any level of alert, if an input is received, the process returns to the main process in which the alert process was activated, and the main process continues.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A system in a restaurant kitchen for controlling preparation of a plurality of food items on a cooking apparatus having a cooking area, said system comprising:
   communication means for receiving an order for a plurality of food items;
   a computer display screen positioned for viewing by a cook;
   a database that stores cooking times for each of the plurality of food items; and
   a controller in communication with the communication means, the display screen, and the database, comprising:
      means for generating on the computer display screen, a graphical representation of the cooking area of the cooking apparatus, said graphical representation including a plurality of logical locations, wherein each logical location corresponds to an actual location on the cooking area of the cooking apparatus;

means for displaying a plurality of icons on the computer display screen, each of said icons corresponding to a particular one of the plurality of food items, and each of said icons being displayed on the display screen in a logical location corresponding to an actual location on the cooking area, said icons indicating to the cook when and where each food item is to be placed on the cooking area;

means for retrieving the cooking times from the database;

means for calculating a start time for each of the plurality of food items such that placing each particular food item on the cooking area at the calculated start time for the particular item results in the preparation of the plurality of food items being completed simultaneously, said calculating means including:

means for causing the displaying means to display the icon for each food item at the calculated start time;

means for calculating a time delay before displaying a subsequent icon after displaying a first icon corresponding to a food item having the longest cooking time, the time delay equaling a difference between the cooking time of the food item having the longest cooking time, and the cooking time of a food item corresponding to the subsequent icon;

means for analyzing the cooking times of the plurality of food items in an incoming order to determine whether there will be space available on the cooking area when it becomes time to place each of the plurality of food items on the cooking area;

means for rescheduling the time for starting the food item having the longest cooking time when the analyzing means determines that there will not be space available on the cooking area when it becomes time to place each of the plurality of food items on the cooking area; and means for indicating to the cook when the preparation of each particular food item is complete.

2. The system of claim 1 wherein the controller also includes means for determining whether the cook has taken an action in response to a displayed icon or in response to an indication that the preparation of a food item is complete.

3. The system of claim 2 wherein the computer display screen is a touch screen display through which the cook interfaces with the controller, said touch screen display providing means for the cook to indicate to the controller that the cook has taken an action in response to a displayed icon or in response to an indication that the preparation of a food item is complete.

4. The system of claim 3 wherein the cooking time for a particular food item includes a plurality of turn times indicating when the food item is to be turned, and the means for indicating to the cook when the preparation of each particular food item is complete also includes means for indicating to the cook when the particular food item is to be turned.

5. The system of claim 4 wherein the touch screen display also provides means for the cook to indicate to the controller that the cook has turned a food item in response to an indication that the particular food item is to be turned.

6. The system of claim 5 further comprising a messaging subsystem interfaced with the controller, said messaging subsystem sending an alert message to a manager if the cook does not respond to an indicated action within a predefined period of time.

7. The system of claim 6 further comprising a temperature probe interfaced with the controller, and the controller includes means for calculating a time at which the cook is to determine the temperature of a particular food item utilizing the temperature probe.

8. The system of claim 7 further comprising a cooking apparatus temperature sensor interfaced with the controller, and wherein the database stores cooking times for each of the plurality of food items based upon different temperatures of the cooking apparatus.

9. In a computerized kitchen control system, a method of controlling preparation of a plurality of food items on a cooking apparatus having a cooking area, said method comprising the steps of:

storing in a database, cooking times for each of the plurality of food items;

receiving through an input device, an order consisting of the plurality of food items;

retrieving by a computer controller, the cooking times from the database for the plurality of food items included in the order;

determining by the computer controller, a primary fire item (PFI), said PFI being the food item in a particular order with the longest cooking time;

calculating by the computer controller, a time delay equaling a difference between the cooking time of the PFI, and the cooking time of a subsequent food item;

determining by the computer controller, whether there is space available on the cooking area of the cooking apparatus to place the PFI, and whether there will be space available on the cooking area for the subsequent food item when the time delay expires;

if the computer controller determines there is space on the cooking area for the PFI and there will be space available for the subsequent food item when the time delay expires:

immediately displaying a first icon associated with the PFI on a computer display screen, said first icon being positioned on the display screen in a logical location corresponding to an actual position on the cooking area where the PFI should be placed; and displaying by the computer controller, the subsequent icon on the display screen when the calculated time delay expires, said subsequent icon being positioned on the display screen in a logical location corresponding to an actual position on the cooking area where the subsequent food item should be placed;

if the computer controller determines there is no space on the cooking area for the PFI, or there will not be space for the subsequent food item when the calculated time delay expires:

calculating by the computer controller, a queue time equal to the time period before the PFI can be placed on the cooking area;

waiting for the queue time to expire before the computer controller displays the first icon associated with the PFI on the computer display screen; and displaying by the computer controller, the subsequent icon on the display screen when the queue time plus the calculated time delay expires, said subsequent icon being positioned on the display screen in a logical location corresponding to an actual position on the cooking area where the subsequent food item should be placed;

wherein by placing the food items on the cooking area when the computer controller displays each icon, the preparation of the food items is completed simultaneously.

10. The method of claim 9 wherein the computer controller repeats the steps of calculating a time delay and displaying a subsequent icon for each food item in the order.

11. The method of claim 10 further comprising the computer controller indicating to the cook when the preparation of each particular food item is complete.

12. The method of claim 9 further comprising the computer controller changing an icon's appearance on the display screen to indicate an action required by the cook.

13. The method of claim 12 further comprising the computer controller sending an alert message to a manager if the cook does not respond to an indicated action within a predefined period of time.

14. The method of claim 9, wherein the plurality of food items are cooked on a plurality of cooking apparatuses, each apparatus having an associated cooking area and an associated computer display screen.

15. A system for controlling preparation of a plurality of food items having different cooking times, said food items being prepared on a cooking apparatus having a finite cooking area with a known capacity for simultaneously cooking a limited number of food items, said system comprising:

a database that stores cooking times for each of the plurality of food items;

means for receiving a food order that includes at least two food items to be prepared on the cooking area;

a control processor that retrieves from the database, the cooking times for the food items in the order and determines a starting time for each of the food items in the order, wherein the processor calculates the starting time for each food item so that the food items in the order are completed simultaneously;

a computer display screen for displaying a plurality of icons, each of said icons corresponding to a particular one of the plurality of food items, and each of said icons being displayed on the display screen at the calculated starting time for a corresponding food item, and each icon being displayed in a logical location corresponding to an actual location on the cooking area, said icons indicating to the cook when and where each food item is to be placed on the cooking area;

means for sending an indication to the control processor whenever a food item is placed on the cooking area, said processor determining when the cooking area is full based on the known capacity of the cooking area and the indications of food items being placed on the cooking area; and said control processor further comprising, responsive to receiving a subsequent food order while the cooking area is full, means for rescheduling the subsequent food order for simultaneous completion by determining a delayed starting time for each food item in the subsequent food order, said delayed starting time ensuring that there will be space available on the cooking area for each food item in the subsequent food order when the delayed starting time for each item expires.

16. The system of claim 15, wherein the control processor controls a plurality of cooking apparatuses, and the system schedules the food orders being prepared on the plurality of cooking apparatuses, and reschedules the food orders when one or more of the cooking apparatuses is full, to ensure simultaneous completion of the food items in each food order.

* * * * *